H. V. P. NIELSEN.
SMOKE SEPARATOR.
APPLICATION FILED SEPT. 12, 1910.

1,009,779.

Patented Nov. 28, 1911.

WITNESSES:
G. Osgood Jones
S. Coleman Bacon

INVENTOR.
Heinrich V. P. Nielsen
BY
Charles W. Hunt
ATTORNEY.

UNITED STATES PATENT OFFICE.

HEINRICH V. P. NIELSEN, OF BOSTON, MASSACHUSETTS.

SMOKE-SEPARATOR.

1,009,779. Specification of Letters Patent. Patented Nov. 28, 1911.

Application filed September 12, 1910. Serial No. 581,696.

*To all whom it may concern:*

Be it known that I, HEINRICH V. P. NIELSEN, a citizen of the United States, residing at Boston, in the county of Suffolk and State of Massachusetts, have invented certain new and useful Improvements in Smoke-Separators, of which the following is a specification.

This invention relates to smoke-separators and more particularly to apparatus for removing the carbon or soot from the volatile productions of combustion, that is such particles as are held in suspension by the gases, and my object is to produce apparatus of this character whereby the gases charged with such carbon or soot may be thoroughly washed to effect the precipitation of the carbon or soot preliminary to the escape of the gases.

A further object is to produce apparatus of this character which will operate efficiently and which can be built and installed in connection with the fire box of any boiler or furnace at a comparatively small expense, whereby the darkness of the smoke may be abated and the smoke emitted into the open air comparatively colorless.

To these ends the invention consists in certain novel and peculiar features of construction and organization as hereinafter described and claimed; and I attain these objects by the apparatus illustrated in the accompanying drawing, in which—

Figure 1:
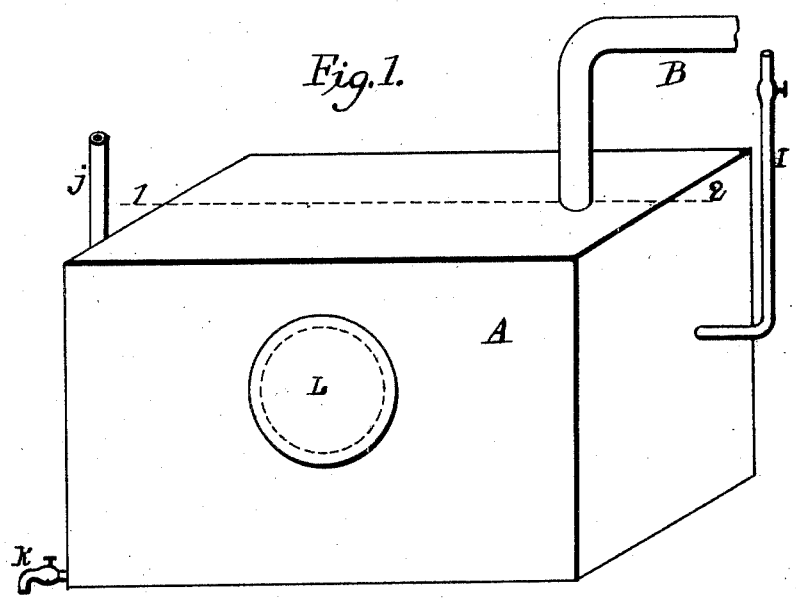
Figure 2:
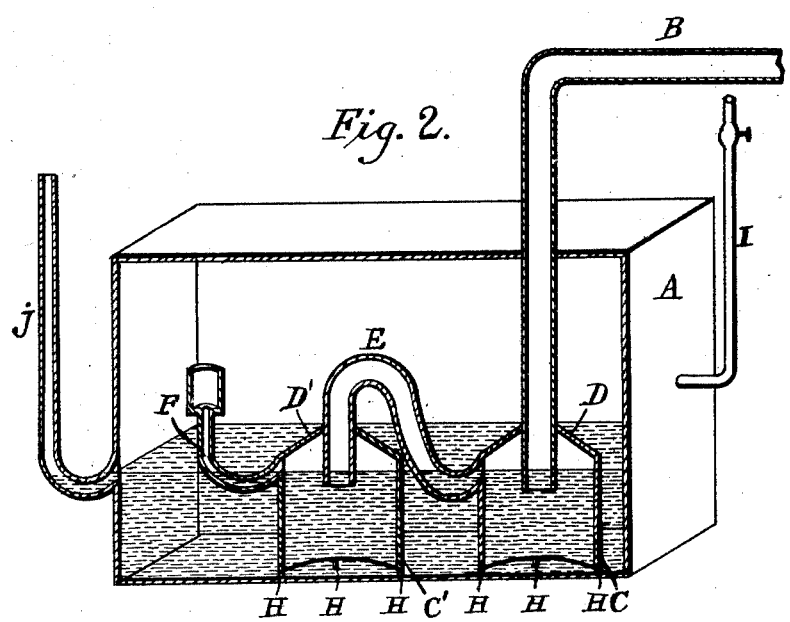

Figure 1 is a view in perspective of the tank; Fig. 2 is a vertical section of the tank on the line 1 2 of Fig. 1, showing a vertical section of the chambers and pipes contained in said tank on said line 1 2.

Similar letters refer to similar parts throughout the several views.

A is an air-tight tank containing water of a desired depth; C is a vertical cylindrical chamber located in said tank, said chamber being open at the lower end, and having a conical or dome shaped sealed top or cover D; the said chamber C is raised a suitable distance from the bottom of the tank A allowing the water in the said tank A to pass freely in or out of the said chamber C maintaining the same level in the chamber as in the tank, and also allowing the solid products that collect in the said chamber and settle at the lower end thereof to wash out or be removed from said chamber; said chamber may be supported in any desired manner but I prefer to support it on legs H as shown in the drawing; B is a smoke pipe or flue passing through the top of the tank A and projecting through the conical or dome shaped sealed top or cover D its end being submerged in the water contained therein, the other end of the said smoke pipe B being connected with a fan or blower, not shown, operated by suitable means for forcing the smoke through the pipe B into the water in said chamber C; C' is another vertical cylindrical chamber having a conical or dome shaped sealed top or cover D'. The said chamber C' is raised a suitable distance from the bottom of the tank A allowing the water in the said tank to pass freely in or out of the said chamber C' maintaining the same level in the chamber as in the tank, and also allowing the solid products that collect in the said chamber and settle at the lower end thereof to wash out or be removed from said chamber; said chamber C' may be supported in any manner desired but I prefer to support it by means of legs H as shown in the drawing. The chambers C and C' are connected by the goose neck pipe E arranged to form a water trap at its end which connects with the chamber C and which is of smaller diameter than the pipe B. The other end of said pipe E projects through the conical or dome shaped sealed top or cover D', its end being submerged in the water therein. It will be observed that the chambers C and C' are similar in construction and that the object of the chamber C' is to repeat the process of washing the smoke as performed in the chamber C.

F is a pipe arranged to form a water trap and having its inlet of less diameter than the inlet of pipe E, and is provided on its upper end with a cup G adapted to hold sponges or other porous material, said pipe allowing the gases or residue of the smoke to pass from the chamber C' into the air-space above the water in the tank A. J is an outlet pipe provided with a water-trap interposed between the ends of said pipe, allowing the gases to escape from the said tank A.

I is a water inlet pipe for supplying the tank with water when desired

K is an outlet pipe for discharging or drawing out the water from the tank when desired.

L is a man-hole cover the dotted line representing the opening in the wall of the tank after the cover is removed.

In operation the fan or blower forces the smoke through the pipe B into the water in the chamber C the carbon or soot being retained in the water the residue of the smoke rising to the air-space in the upper end of the said chamber C and being retarded by the water-trap in the pipe E is compressed until the pressure is sufficient to overcome the resistance of the water-trap whereupon it passes through the pipe E into the water in the chamber C′ where the same process is repeated and the residue of the smoke passes through the pipe F into the air-space above the water in the tank A, the gases or residue of the smoke being again compressed until the pressure overcomes the resistance of the water-trap in the pipe J, whereupon the gases or residue of the smoke escape into the open air separated from the carbon or soot and comparatively colorless.

It will be seen from the drawing that the main feature of the apparatus is the arrangement of suitable chambers containing water and suitable connecting and discharging pipes provided with water-traps, through which the gases or residue of the smoke pass, thereby receiving successive washings. It will be apparent from the drawings that the outlet to each bath is constricted in comparison to its inlet. This has been found to be practically essential to an effective cleansing of the gases.

I also wish it to be understood that I do not desire to be limited to two chambers as shown and described, as under some circumstances one chamber may effect the desired result, and under other circumstances more than two chambers may be necessary to effect the desired result, it being obvious that the number of chambers necessary in the tank will depend on the size of the fire box of the boiler or furnace producing the smoke.

I am aware that prior to my invention smoke separators have been made consisting of a tank containing water, and a fan or blower for forcing smoke into water, thereby washing it. I therefore do not claim such a combination broadly; but

I claim:

A smoke-separator, comprising a closed chamber, receptacles independent of and disposed within said chamber, and each having an open bottom, a closed top, and legs supporting it above the bottom of said chamber, pipes connecting the several receptacles and each extending from a point near the water level in one receptacle to a point below the water level in the next receptacle, and formed, intermediate its ends, with a water-trap, an inlet-pipe for the gases and smoke communicating with the first chamber, a pipe leading from the last receptacle in the series and extending upward entirely within said chamber, and formed, intermediate its ends, with a water-trap, and, at its top, with a cup adapted to contain a sponge or the like, and an outlet-pipe for the gases communicating with said chamber and formed, intermediate its ends, with a water-trap.

HEINRICH V. P. NIELSEN.

Witnesses:
 CHARLES D. BAKER,
 G. OSGOOD JONES.

---

Copies of this patent may be obtained for five cents each, by addressing the "Commissioner of Patents, Washington, D. C."